UNITED STATES PATENT OFFICE.

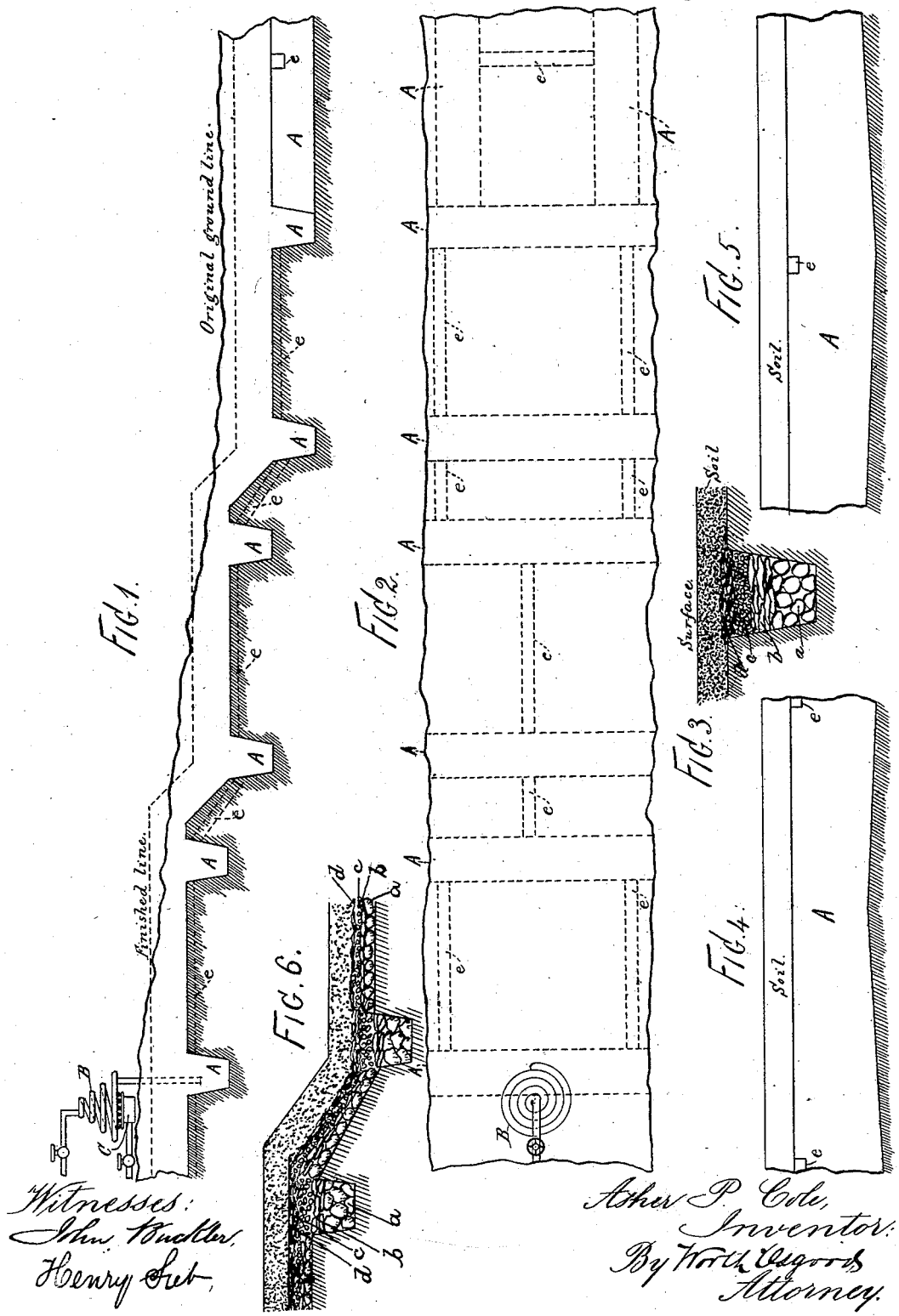

ASHER P. COLE, OF BROOKLYN, NEW YORK.

MEANS FOR IRRIGATING AND DRAINING.

SPECIFICATION forming part of Letters Patent No. 302,322, dated July 22, 1884.

Application filed September 24, 1883. (No model.)

*To all whom it may concern:*

Be it known that I, ASHER P. COLE, of Brooklyn, county of Kings, and State of New York, have invented certain new and useful Improvements in Irrigating and Draining, of which the following is a full, clear, and exact description, reference being had to the accompanying drawings, and to the letters of reference marked thereon.

My invention has relation to irrigating and draining lands for agricultural or tilling purposes.

The object of my said invention is to provide a series of under drains or water-ways so constructed, connected, and arranged as to provide the proper amount of moisture for the plants upon the entire cultivated surface, and to effectually counteract the disadvantageous effects of frost, droughts, or floods, which arrangement shall be equally applicable and equally efficacious upon level or sloping lands, and upon dry or wet lands, bringing all to the desired condition for the production of crops, leaving the entire land-surface free for cultivation, and enhancing the producing capacity of the soil, as well as diminishing the time required to bring the plants to maturity. To accomplish all of this, my improvements involve certain novel and useful peculiarities of construction and arrangements or combinations of the drains or blind ditches and their connections, the co-operation with these of certain adjuncts for regulating the inflow and temperature of water in certain cases, and certain principles of operation, all of which will be herein first fully described, and then pointed out in the claims.

To illustrate the principles and modes of construction applicable in carrying out my invention, I have chosen a plant as represented in the accompanying drawings, wherein—

Figure 1 is a sectional elevation of a bit of ground prepared in accordance with my invention, and Fig. 2 a general plan view thereof, the natural surface of the soil in Fig. 1 being represented by a full line, and the final surface to which it is reduced by a dotted line. Fig. 3 is a cross-section of one of the main ditches or drains, the same being filled for use. Figs. 4 and 5 are longitudinal sections showing the forms or slopes upon the bottoms of alternate drains or main ditches. Fig. 6 is a section through a main ditch and connecting-drain.

In all these figures like letters of reference, wherever they occur, indicate corresponding parts.

I generally proceed by first removing to one side the soil from over the location of the ditches or drains, preserving the same for future replacement. The ditches, as A A A, &c., are then sunk into the subsoil, and if convenient a little way into the hard pan, to afford a firmer bottom than would otherwise be obtained. These ditches may be about three feet deep, or more or less, according to circumstances, and they may be bottomed or lined with boards or slabs, as may be required, or be otherwise finished, so as to afford the desired water-ways. These ditches are located in substantially parallel lines, and at distances from each other varying according to the nature and declination of the soil, so that the entire planting-surface shall be about uniformly moistened or drained. For example, in Fig. 1 the first two ditches at the left are intended to be about twelve feet apart. The next succeeding ditch is on a lower level, and much closer, followed by another, distant about twelve feet, and so on down the hillside. Into the bottoms of these ditches I place the larger rounded stones and broken fragments, as indicated at *a*, Fig. 3, so that the water may freely percolate between them. Upon these I place the flat stones, as at *b*, and cover the flat stones with the small round stones, as at *c*, obtained by raking or screening the soil or subsoil which has been removed. Upon the stone-bed so formed I place any kind of rubbish—such as weeds, straw, small sticks, brush, and branches or old bits of carpets, &c., as at *d*, intended to form a kind of mat or sponge to facilitate the passage and distribution of moisture to the soil above. So much of the subsoil as may remain is then pulverized and placed upon the mat, and above it the soil itself. The ditches are sunk deep enough so that the mats will not be disturbed by the plow or spade. The soil between the ditches may, if desired, be carefully worked over and freed of all stones, &c., and it is replaced or leveled off in such manner as to afford a series of terraces, as indicated by dotted line in Fig. 1. When the system is applied upon level land, the terracing is of course omitted. Water being admitted to the system of ditches by rainfall, or to the upper ditch in the system from any convenient source, fills that ditch to the level of the mouth of the connecting drains $e$, or porous soil leading therefrom to the next ditch, from which it follows on through a drain or drains or the soil to the next, and so on throughout the system. These little cross-drains lead from points near the tops of the main ditches, so that a body of water shall always remain in the main ditches. They (the cross-drains) are made by digging shallow trenches, which are partly filled with stones, and covered same as the large ditches, or by laying sticks, &c., in the soil, or otherwise making it open and porous, so that it will convey water from one main ditch to another. The bottoms of the alternate main ditches are preferably sloped, as indicated in Figs. 4 and 5, so that water will flow toward the ends of one and toward the center of the next, thus insuring a more perfect distribution. The connecting drains are arranged as indicated in the plan, Fig. 2, so as to connect the centers of some of the main ditches and the ends of others, to insure a thorough and uniform distribution. When the hillside terminates in a level portion, as in the drawings, the ditches under the level portion may run in a general direction perpendicular to those on the hillside. The water is thus distributed and very uniformly absorbed by the mellowed ground prepared as above explained. The ground or plant being so finished, in the event of a drought water is supplied to the first ditch and gradually finds its way throughout the whole system without further attention. The rainfall or floods can in no way damage the crops, as the water percolates through the soil, finds its way into the ditches, and is carried off beneath the soil. The improved arrangement is likewise applicable for draining moist lands where any outlet can be obtained for the water, and it may be applied upon any scale, great or small, as may be required. Under ordinary circumstances the water below the soil will convey sufficient warmth to the roots of the plants above to prevent damage thereto by moderate frosts, and this warmth also increases the growth of the plants, as well as the productiveness of the soil.

In many cases it may be desirable to heat the water which is supplied to the ditches. At B, I have shown an ordinary pipe, through which water is supplied in quantities, as may be required. This may be coiled or otherwise arranged to receive the heat from a gas-stove, as C, fed by gas from a natural well. Of course the water might be otherwise heated, the more economically the better; and the above is only intended to represent an economical heating adjunct. This plan for irrigating and draining, arranged for operation substantially in accordance with the foregoing explanations, has been found in practice to admirably answer the purpose or object of the invention, as previously set forth.

Having now fully described my invention, what I claim as new, and desire to secure by Letters Patent, is—

1. The herein-described means for irrigating and draining for agricultural purposes, the same consisting of a series of ditches or drains filled with stone, a covering of rubbish over the stone to form a permeable mat, and a covering of earth over the mat, and a series of cross-drains connecting the main ditches, and having a permeable filling to close the drains and yet permit the passage of water from one main ditch to another, said cross-drains being located to maintain a certain level of water in the main ditches, substantially as set forth.

2. The means herein described for irrigating and draining for agricultural purposes, consisting of a series of main ditches or drains filled with capillary material and covered with soil, as described, the bottom of one ditch having a slope or fall toward its sides, and the adjoining ditch a slope or fall toward its middle, and a series of cross-drains connecting the main ditches at such points as to maintain a level of water in the main ditches, substantially as set forth.

3. In irrigating and draining, the combination of the main ditches, filled and covered as explained, the cross connecting drains or porous soil uniting one ditch with the next succeeding, and the water-conduit and water-heater, all arranged for operation substantially as and for the purposes explained.

In testimony that I claim the foregoing I have hereunto set my hand in the presence of two witnesses.

ASHER P. COLE.

Witnesses:
FRANK R. BAGLEY,
A. P. WOODRUFF.